May 22, 1928.                                                  1,670,695
R. D. STROUP
BRAKE MECHANISM
Original Filed Jan. 10, 1924     2 Sheets-Sheet 1

Inventor
R. D. Stroup
By Sol Shappirio
Attorney

May 22, 1928. 1,670,695
R. D. STROUP
BRAKE MECHANISM
Original Filed Jan. 10, 1924   2 Sheets-Sheet 2

Inventor
R. D. Stroup
Sol Shappirio
Attorney

Patented May 22, 1928.

1,670,695

UNITED STATES PATENT OFFICE.

ROBERT D. STROUP, OF MARFRANCE, WEST VIRGINIA, ASSIGNOR OF ONE-THIRD TO H. S. NELSON, OF LESLIE, WEST VIRGINIA, AND ONE-THIRD TO JOHN B. LAING, OF LEWISBURG, WEST VIRGINIA.

BRAKE MECHANISM.

Application filed January 10, 1924, Serial No. 685,408. Renewed October 14, 1927.

This invention relates to brake mechanism and more particularly to such mechanism wherein the brake is positively locked in operative position so that it cannot be released by chance or accident until such release is directed by the engineer or other operator.

Attempts have been made in the prior art to secure a positively locked brake. It has been sought primarily to insure positive braking action to prevent for example, runaway trains, due to failure of air pressure, or for other reasons. It is obvious that in fluid or electrically operated brakes, if at any time there is a failure of the fluid pressure or of the electric current, the brakes must cease functioning. Then too when cars are shifted from a train to a siding, leakage of air will gradually unset an air brake, so that a car standing on a grade, would run away. But the devices of the prior art referred to above, which have sought to overcome these difficulties, were themselves so complicated and costly that their use was impracticable, and usually also inoperative. One of the chief reasons for this was that such prior art devices required double sets of mechanism, including air cylinders, pipe lines, etc.; one set for locking and the other for releasing purposes. The changes thus required in such devices from the brake mechanism in use at the present time made the changes prohibitive.

One of the objects of the present invention is to provide locking mechanism for a brake which will be positive in action and under the control of the engineer or operator at all times.

Another object of this invention is to provide such locking mechanism of simple and efficient construction.

A further object of this invention is to provide simple and efficient releasing mechanism for the locked brake.

A further object of this invention is to eliminate the use of retainers.

A still further object of this invention is to allow the release of such positively locking brakes at any time that it is desirable to go into the "emergency" position.

A still further object of this invention is to provide such mechanism so that it may be applied to the brakes now in use with a minimum replacement and consequent scrapping of the old working parts.

Figure 1:
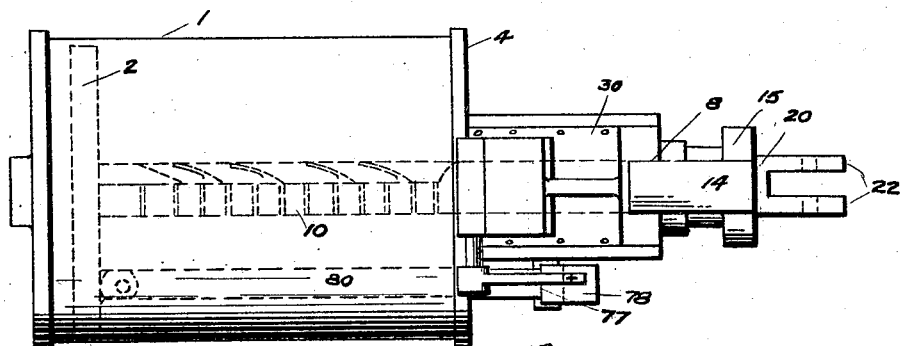
Figure 2:
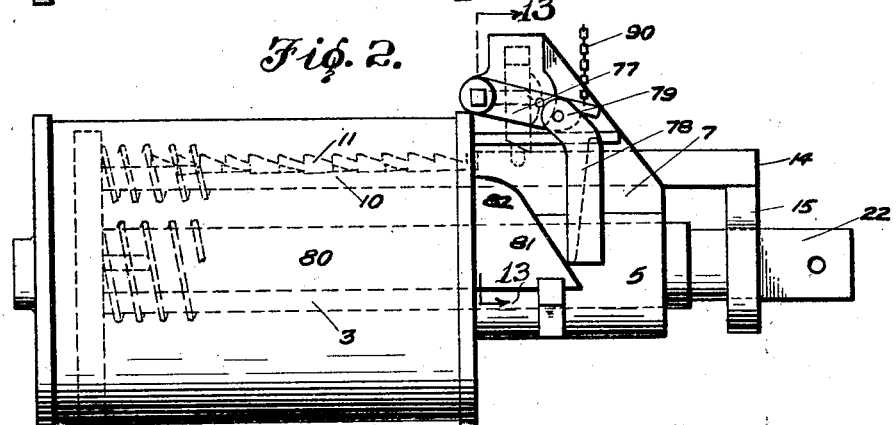
Figure 3:
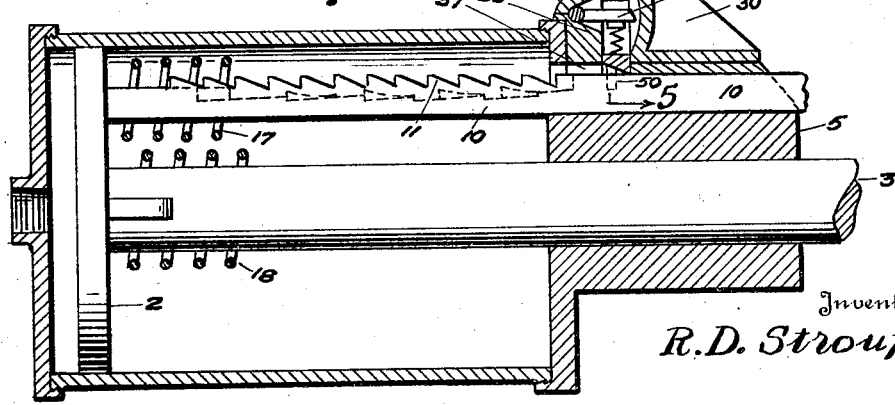
Figure 4:
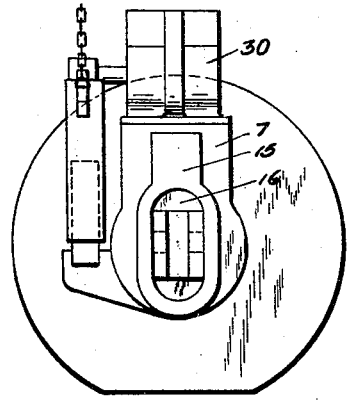
Figures 5, 13:
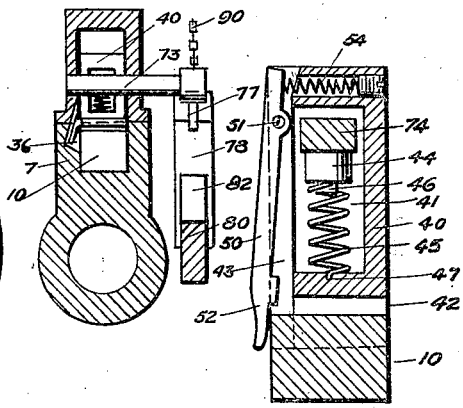
Figure 14:
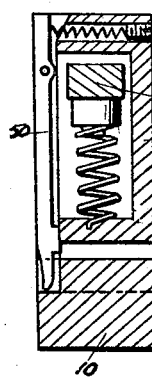
Figure 6:
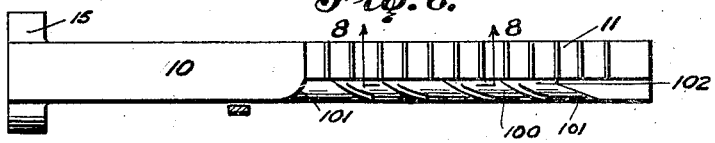
Figure 7:
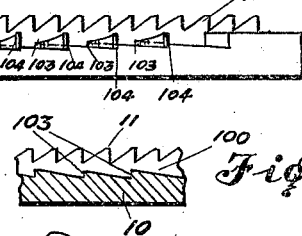
Figures 8, 9:
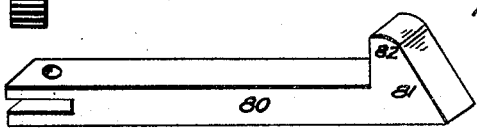
Figure 10:
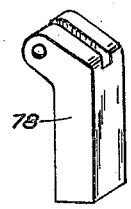
Figure 11:
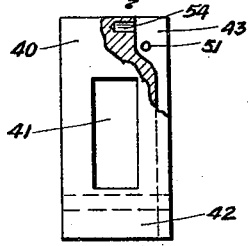
Figure 12:
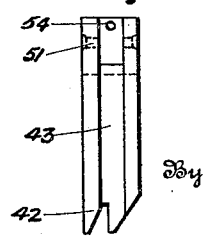

Other and further objects and advantages of this invention will appear from the more detailed description set forth below by way of illustration, in connection with the mechanism illustrated by way of example in the accompanying drawings, wherein Figure 1 shows a plan view of the assembled mechanism; Figure 2 shows a side elevation of the mechanism; Figure 3 shows a vertical section through the center of the device; Figure 4 shows an end elevation of the device; Figure 5 shows a detail in section of the releasing pawl in inoperative position; Figure 6 shows a detail of the improved form of holding bar; Figure 7 is a side elevation of the improved holding bar with a fragmentary view of the locking and releasing pawls; Figure 8 is a section on the line 8—8 of Figure 6; Figure 9 is a perspective of the releasing rod; Figure 10 is a perspective of the rocking dog; Figures 11 and 12 side and end elevations of the locking pawl; and Figure 13 a section showing the pawls in operative position after initial operation of the mechanism; and Figure 14 shows a detail in section of the releasing pawl in operative position.

But it will be understood that the description and drawings are to be taken as illustrative only, and not by way of limitation since various changes may be made in the devices as illustrated and described, by those skilled in the art to which this invention appertains, without departing from the spirit and the scope of this invention.

In general it will be seen that this invention comprises exceedingly simple means for positively locking and releasing brakes which may be applied to brakes of all kinds whether operated manually, electrically, or by fluid pressure, for example, air, steam, etc. For purposes of illustration however the device will be shown in use with air pressure brakes.

In its fundamental aspect the invention sets forth means operated by the existing air brake cylinder to lock the brake in operative position after it has been set, and means for releasing the locking mechanism also preferably operated by the same air cylinder. As a result it is possible to make use of practically the present equipment on trains with but slight modification. As set forth above, this invention may be applied to any type of brake, although it is illustrated with an air brake. In such adaptation to other forms of brakes, all that is required is that there shall be holding bar or its equivalent which is operated by the brake operating mechanism in its usual course of operation. This bar is then locked by the locking means, and may be subsequently released by the releasing means. It is immaterial for the purposes of the present invention whether the holding bar or its equivalent is operated by fluid pressure, electrically, or otherwise. Its application to any of these brakes will be obvious from the detailed description.

Referring more particularly to the drawings there is shown by way of illustration, the conventional brake cylinder 1 within which reciprocates the usual piston 2, actuating piston rod 3, which extends through the cylinder head 4. In this modification of the invention, the usual cylinder head is replaced by one similar to that illustrated in accordance with the principles of this invention. This cylinder head 4 thus carries a small cylindrical member 5, through the opening of which the piston rod 3 extends. Upon this member 5, and preferably, there are two strips 7, 7 which may be made integral with the member 5 and preferably are so made, these strips acting to form a channel 8 within which the holding bar 10 reciprocates.

The holding bar 10 carries a rack 11 on its upper face which extends from its inner end of the bar for about half of its length, more or less, although this exact distance is governed by other considerations or requirements, for example the minimum distance of operation before brake action shall begin. On its outer end 14, the bar 10 carries a depending ear 15 provided with an aperture or opening 16 through which opening the brake rod link 20 passes to the brake rod, and serves to transmit the motion from the piston rod to the brake rod, whereby the brake is operated. Due to the bifurcated ear 22 of the link, by means of which it is connected to the brake rod, when the bar 10 has advanced to its locked operative position, the link cannot move inwardly, but its movement in that direction is obviously limited by the ear 15. One of the sides of the bar 10 is cut away to form a groove 100 which is beveled at 101 to the side of the bar. This groove is made to receive the releasing pawl described below.

This groove 100 with its beveled ends 101 may extend for the entire length of the rack 11 on the bar 10, or for only a portion thereof. And while a groove of this character has been used in actual practice, this groove is preferably used in the following modification. Along its inner portion 102, a series of shoulders 103 are formed. From these shoulders, teeth 104 extend diagonally across the groove to its outside edge, rising at their outer ends so that they are higher at the outer ends than at the inner ends. There will generally be as many teeth as there are shoulders 103, and the number of each may be varied at will, depending on the control desired. Five have been found in practice to give efficient results. These shoulders 103 and teeth 104 will be hereinafter referred to as "emergency points" and their function will be fully described below.

A cover plate 30 serves to form a housing for the locking pawl 40 and the releasing pawl 50. For this purpose it is provided with a vertically extending hood 31 which has vertical sides 32 and 33 forming the channel within which the locking pawl operates. The side 33 is formed as shown at 34 to provide a bearing surface for the rocking arm 73. The remainder of the channel within which the locking pawl operates, is formed from a block 35, provided on its upper side or face with the lower half of the bearing surface for the rocking arm. In the preferred form, the block 35 is integral with the cylinder head 4. The cylindrical member 5 of the cylinder head carries an opening 37 through which the bar 10 moves. The lower end of the channel referred to above is thus open to the bar 10 so that locking pawl 40 may contact with the upper face of the bar 10.

This locking pawl 40 is cut away as shown at 41 to form an opening for the purposes described below. The pawl is beveled at its lower end 42 so that it can coact with the teeth of the rack bar 10. At one side of the pawl, a longitudinal channel 43 is cut to receive the releasing pawl 50.

The releasing pawl 50 is pivoted at 51 for transverse movement in the channel 43, the arm 35 adjacent to this pawl being cut away as at 36 to allow such movement. The pawl 50 is spring pressed as shown at 54 so that in its normal position the releasing pawl presses against the side 21 of the rack bar 10, but outside of the groove 100 referred to above. In its operative position however, the pawl 50 rides in the groove 100.

The rocking arm 73 carries a lug 74 rigidly attached thereto as at 75. This lug extends within the opening 41 adjacent to the upper part thereof, so that when the rocking arm is rocked counterclockwise on its bearings, the lug serves to raise the locking pawl free of the rack on the bar 10. In order to retain the locking pawl in contact with the teeth of the holding bar 10, a block 44 held in place in any desired manner is reposed against the action of a spring 45, acting against this block and the lower edge of the opening or passageway 41, serves to press the locking pawl down against the teeth of the bar 10. The spring 45 may be retained in proper position by means of any ordinary securing devices, such as lug 46 in the block and the recess 47 in the locking pawl.

The end of the rocking arm is adapted to receive a rigidly connected arm 77 which carries a dog 78 pivoted for free clockwise movement only, to arm 77 as at 79. If moved counterclockwise, it moves the arm 77.

Further there is provided attached to piston 2, a trip rod or releasing rod 80 formed at its outer end with an ear 81 which is designed to ride against the dog 78, when the piston is operated so that movement of the piston carries the ear against the dog, trips the latter, which in turn causes the rocking arm to move and actuate the locking pawl.

The releasing or trip bar 80 is preferably constructed as set forth in Figure 9. The ear 81 is carried upwardly to form a well rounded extension or edge 82 over which the dog 78 moves. The ear 81 after forming this edge may drop down sharply to the edge of the bar 80 as shown in Figure 9.

It has been found furthermore, that due to the weight of the parts when assembled, that the spring 45 with its attendant parts may be omitted. As a result this pawl is much simplified and takes the form 40 provided with an opening 41 which receives the lug 74 of the rocking arm 73. This pawl may terminate in a single beveled edge 42 as shown in the type of device illustrated above or it is preferably formed into several teeth 42 which serve to give a better grip on the bar 10. The pawl 40 also carries the longitudinal channel 43 in which the releasing pawl 50 is pivoted through the pivot openings 51. The recess 54 forms a seat for the spring 54' which presses against the upper end of the pawl 50.

When the device has been assembled with the parts related as described above, it is ready for use and operates as follows. When the engineer applies the brakes, the piston rod moves outwardly and by means of the brake rod, the brakes are brought into operative position. At the same time, the piston moves against the inner end of the bar 10, carrying it out until, when the movement has been sufficient, the teeth of the rack engage the pawl 40, which then locks the rack and bar against inward movement. Now at this time regardless of what happens either to the air line, or within the cylinder, the brake rod is positively locked in position, so that the brakes cannot be released until the engineer under whose control the entire mechanism is placed, desires to do so. In this way, it will be seen that although the air pressure in the line may vary, or decrease due to leakage, the brakes are positively locked so that the train cannot move until desired. In this connection attention is called to the fact that, generally, the brake rod, or piston rod, must move a minimum distance, (say about three and a half inches) for what is termed leakage groove, before the brake shall begin to operate. Advantage is taken of this fact in the present invention as set forth above. The rack bar is not toothed or grooved throughout its entire length, but is left untoothed in that part of the rack bar that will ride under the locking pawl during the travel of the piston through the distance referred to above. Consequently at this time, when the brakes are being set, the dog is tripped, by the ear of the tripping rod 80, but since the bar at this point is neither grooved or toothed, the locking pawl 40 immediately drops back to its normal position, in view of the fact that the groove 100 starts at about the same point on the bar as the rack. When the brakes are however once set and locked as set forth above, the piston and piston rod may return to their normal position and do so, under the action of the spring described above, the ear of the tripping rod riding under the dog without reciprocating the rocking arm due to the pivoted connection between the arm and the dog described above.

When however it is desired to release the brakes and allow them to cease their braking action, the engineer once more applies the brake but it is only necessary to move the piston a small distance, namely until the sliding or releasing arm 80 through the ear, trips the dog. In other words, regardless of the pressure that has been used in setting the brakes, in order to unset them a minimum pressure only is required, one to two pounds being generally sufficient depending on the length of the train and other obvious considerations. In this way a remarkable saving in air is effected. At this time the locking pawl is raised as described above. The releasing pawl is thus raised until it rests in the groove 100 and due to the spring 54 it is maintained therein. In this position the releasing pawl prevents the locking pawl from dropping on to the rack of the bar 10. The locking pawl thus being held out of operative engagement with the rack, the bar 10 is free to move inwardly until it once more contacts with the piston in its normal position, and remains there. At the same time, that the bar 10 is travelling inwardly, the releasing pawl is riding in the groove 100 until it reaches the beveled edge 101, when it is then urged out of the groove and drops to its normal position allowing the locking pawl to drop down on to the upper face of the bar 10. The parts are now in their normal position ready for repeated operation.

When the releasing pawl has been brought into operative position as described above, it rides in the groove 100 until it is forced out of that groove as just described after the parts have returned to their so called normal position. But it sometimes becomes necessary or desirable, to immediately apply the brakes at a time intermediate between their release as just set forth above, and before they have assumed their normal position. For this purpose, the emergency points referred to above have been supplied. If at any moment after the locking pawl has been released, and before the parts have resumed their normal position, it is desired to apply the brakes again, the engineer starts to operate them without waiting for the parts to assume their normal position, by applying the desired pressure. The inward movement of the bar 10 which started at the releasing operation will be arrested and the bar 10 will reverse its movement, and begin to move outwardly. For the time being however, were it not for the "emergency points", the brakes could not be locked since the releasing pawl 50 would remain in the groove 100 and maintain the locking pawl 40 above and out of contact with the rack 11. The locking pawl must be restored to its contact with the rack 11 and this is accomplished by the emergency points. As soon as the bar 10 reverses its movement as set forth above, the releasing pawl rides momentarily in the groove 100 until it reaches one of the shoulders 103. As the bar 10 continues its movement, the pawl 50 cannot ride up over the shoulder, but by means thereof it is forced along the diagonally placed tooth 104 adjacent to the shoulder 103 which stopped its movement, until it reaches the outer edge of the groove 100, when it will drop off and out of that groove, and thus allow the locking pawl once again to reengage the rack teeth 11. It will be obvious that such "emergency points" will enable immediate locking action of the bar and brakes to be secured at any time during the releasing operation, and will be more or less controlled by the number of emergency points that are used.

Sometimes, when a car is switched off of a train or line of cars, it is desirable to provide means whereby the brake may be released and restored by hand. This is accomplished as follows. There is attached to the tripping arm 77 at a point preferably as far as possible from its upper end, a chain or equivalent device 90, which is adapted to be wound up or pulled over by a vertical hand brake staff similar to that now in use on hand brakes. It is obvious that when the element 90 is pulled over or wound up by the operation of the hand wheel, etc., the rocking arm 73 will be operated to release the locking pawl so that the brake rod may return to its normal position under the action of the spring.

At times it is desirable to use this invention without the releasing pawl, and in such cases the latter may be easily eliminated. Such omission allows one to drop from a higher to a lower pressure without first going through the releasing operation. This result follows from the fact that when the brakes have once been set and locked, when no releasing pawl is used, all that is necessary is that the engineer should move the brake to the pressure that he desires to apply. As the ear 81 of the bar 80 passes the dog 78, the latter is tripped rocking the arm 73 and moving the pawl out of contact with the bar 10. At this time as just explained above, the "throw" of the brakes will tend to restore the parts to their normal position. This throwing action is due to the normal resistance of the brakes and is given more time to come into action due to the large ear on the tripping rod 80. As soon however as the brake rod and piston rod move back to the point where the rack bar 10 has been locked, they cannot move further and are therefore locked in the lower pressure position.

The cover plate 30 serves to protect the working parts against the entrance of dirt, etc., and may also be provided with oil cups, etc., in order to lubricate the working parts.

Having set forth my invention, I claim:

1. In brake mechanism, means for locking the brake after being set, means for releasing the locking means, and emergency means for unsetting the releasing means.

2. In brake mechanism, a holding bar, locking means operated by said holding bar to lock the latter in operative position, releasing means to release said locking means, and emergency means for unsetting the releasing means.

3. In brake mechanism, a holding bar, locking means for locking the holding bar in operative position, means for releasing said locking means, and emergency means for unsetting the releasing means.

4. In brake mechanism, a reciprocating holding bar, means for locking said holding bar on initial movement, means for releasing said locking means, and emergency means for unsetting the releasing means.

5. In brake mechanism, a reciprocating holding bar, means for locking the bar on initial movement, and means for releasing the holding bar on further movement thereof, and emergency means for unsetting the releasing means.

6. In brake mechanism, a fluid pressure cylinder, a reciprocable piston within said cylinder operating under said fluid pressure, a holding bar operated by said piston, means for locking said holding bar upon movement of the piston, and means for releasing said locking means upon further operation of said piston, and emergency means for unsetting the releasing means.

7. In brake mechanism, a holding bar, means for causing movement of said bar, means for locking said bar after such movement, means for releasing said locking means, and means for unsetting the releasing means.

8. In brake mechanism, a holding bar, means for causing movement of said bar, means for locking said bar after such movement, means for releasing the locking means operated by the means for causing the movement of the holding bar, and means for unsetting the releasing means.

9. In brake mechanism, a fluid pressure cylinder, a piston within said cylinder operating under said fluid pressure, a brake rod operated by said piston, means for locking said brake rod in operative position upon reciprocation of said piston, means for releasing said locking means upon further reciprocation of said piston, and means for unsetting the releasing means.

10. In brake mechanism, a holding bar provided with a rack, a pawl engaging said rack to lock the bar against movement in one direction, means for releasing said locking pawl, and means for unsetting the releasing means.

11. In brake mechanism, a holding bar provided with a rack, a pawl engaging said rack to lock the bar against movement in one direction, and means comprising a releasing pawl for releasing said locking bar, and emergency means for unsetting the releasing means.

12. In brake mechanism, a holding bar provided with a rack, a pawl engaging said rack to lock said bar against movement in one direction, a groove in said bar, a releasing pawl carried by said locking pawl and adapted to ride in the groove aforesaid and to keep the locking pawl from operative engagement with the said rack, and emergency means for unsetting the releasing pawl.

13. In brake mechanism, a holding bar provided with a rack, a pawl engaging said rack to lock the bar against movement, means comprising a releasing pawl for releasing said locking pawl, means for removing said releasing pawl out of its operative position so that the locking pawl may reengage said rack, and emergency means for unsetting the releasing pawl.

14. In brake mechanism, a holding bar provided with a rack, a pawl engaging said rack to lock said bar against movement, a groove in said bar, a releasing pawl carried by said locking pawl and adapted to ride in the groove aforesaid and to keep the locking pawl from operative engagement with the said rack, means for removing said releasing pawl out of said groove so that the locking pawl may reengage said rack, and emergency means for unsetting the releasing pawl.

15. In brake mechanism, a holding bar provided with a rack over a portion of one face thereof, a groove in said bar, and "emergency points" in said groove.

16. In brake mechanism, a holding bar provided with a rack, a longitudinal groove in said bar, said groove being provided with teeth placed diagonally therein.

17. In brake mechanism including brake locking and releasing devices, means for unsetting the releasing device at any desired time.

R. D. STROUP.